US009692519B2

(12) United States Patent
Xie et al.

(10) Patent No.: US 9,692,519 B2
(45) Date of Patent: Jun. 27, 2017

(54) LEVEL SPACING FOR M-PAM OPTICAL SYSTEMS WITH COHERENT DETECTION

(71) Applicant: Alcatel Lucent, Boulogne-Billancourt (FR)

(72) Inventors: Chongjin Xie, Morganville, NJ (US); Po Dong, Morganville, NJ (US); Peter J Winzer, Aberdeen, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 15/172,629

(22) Filed: Jun. 3, 2016

(65) Prior Publication Data

US 2016/0285559 A1    Sep. 29, 2016

Related U.S. Application Data

(60) Division of application No. 14/032,886, filed on Sep. 20, 2013, now Pat. No. 9,374,167, which is a continuation-in-part of application No. 13/929,757, filed on Jun. 27, 2013, now abandoned.

(60) Provisional application No. 61/772,664, filed on Mar. 5, 2013, provisional application No. 61/769,078, filed on Feb. 25, 2013.

(51) Int. Cl.

| H04B 10/00 | (2013.01) |
|---|---|
| H04B 10/54 | (2013.01) |
| H04B 10/079 | (2013.01) |
| H04B 10/61 | (2013.01) |
| H04J 14/06 | (2006.01) |

(52) U.S. Cl.
CPC ......... *H04B 10/54* (2013.01); *H04B 10/0795* (2013.01); *H04B 10/541* (2013.01); *H04B 10/61* (2013.01); *H04J 14/06* (2013.01)

(58) Field of Classification Search
CPC ..................................................... H04B 10/54
See application file for complete search history.

(56) References Cited

U.S. PATENT DOCUMENTS

| 2006/0262876 | A1* | 11/2006 | LaDue | H04B 7/00 375/295 |
|---|---|---|---|---|
| 2008/0205905 | A1* | 8/2008 | Tao | H04B 10/61 398/204 |
| 2009/0196602 | A1* | 8/2009 | Saunders | H04B 10/5053 398/26 |
| 2010/0002751 | A1* | 1/2010 | Dent | H04L 27/3416 375/141 |
| 2011/0103529 | A1* | 5/2011 | Kim | H04B 10/60 375/344 |
| 2011/0170690 | A1* | 7/2011 | Shpantzer | H04B 10/548 380/256 |
| 2011/0236033 | A1* | 9/2011 | Kikuchi | H04B 10/50 398/183 |

(Continued)

*Primary Examiner* — Danny Leung
(74) *Attorney, Agent, or Firm* — Andrew R. Ralston

(57) ABSTRACT

An apparatus includes an optical transmitter configured to provide an optical signal amplitude-modulated among M different levels. A constellation control module is configured to provide a drive signal to control the optical signal. A feedback module is configured to receive a measure of spacing between amplitude peaks of a symbol constellation of the optical signal. The feedback module is further configured to regulate the constellation control module to adjust the optical signal in response to the measure of spacing.

13 Claims, 16 Drawing Sheets

(56) References Cited

U.S. PATENT DOCUMENTS

| | | | |
|---|---|---|---|
| 2011/0305457 A1* | 12/2011 | Kikuchi | H04B 10/5055 398/65 |
| 2011/0314352 A1* | 12/2011 | Djordjevic | H03M 13/1117 714/752 |
| 2012/0032855 A1* | 2/2012 | Reede | G01S 5/0289 342/458 |
| 2012/0084617 A1* | 4/2012 | Djordjevic | H03M 13/033 714/752 |
| 2012/0250785 A1* | 10/2012 | Vidal | H04L 1/004 375/295 |
| 2013/0170831 A1* | 7/2013 | Rahn | H04B 10/0779 398/29 |
| 2013/0336649 A1* | 12/2013 | Essiambre | H04L 27/06 398/27 |
| 2014/0064734 A1* | 3/2014 | Witzens | H04B 10/64 398/79 |
| 2014/0119731 A1* | 5/2014 | Sugitani | H04B 10/614 398/65 |
| 2014/0169802 A1* | 6/2014 | Magri | H04B 10/541 398/183 |
| 2014/0199068 A1* | 7/2014 | Kaneda | H04B 10/6166 398/65 |
| 2014/0226977 A1* | 8/2014 | Jovicic | H04B 10/116 398/26 |
| 2014/0241722 A1* | 8/2014 | Xie | H04B 10/532 398/65 |
| 2015/0086216 A1* | 3/2015 | Xie | H04B 10/54 398/186 |
| 2015/0372852 A1* | 12/2015 | Delaruelle | H04L 1/0057 375/298 |
| 2016/0285559 A1* | 9/2016 | Xie | H04B 10/54 |

\* cited by examiner

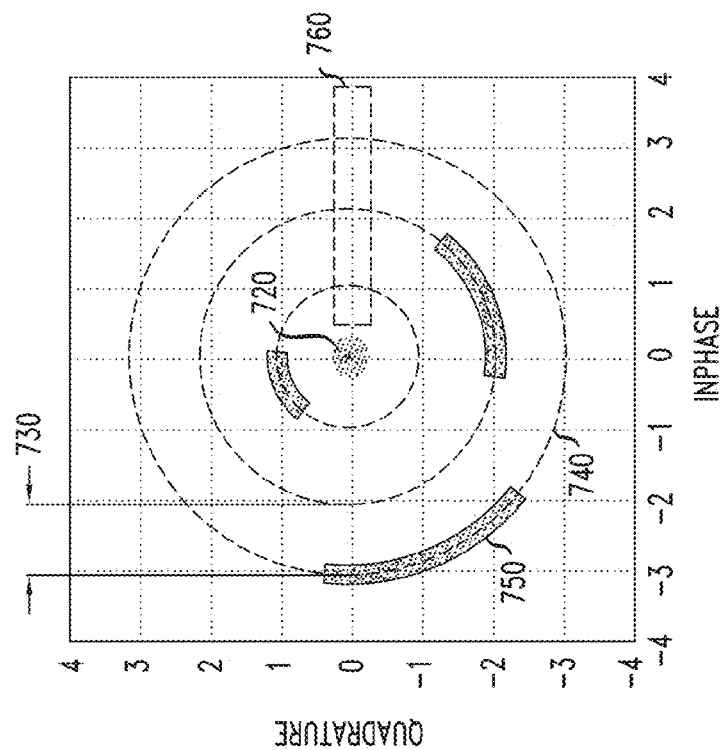
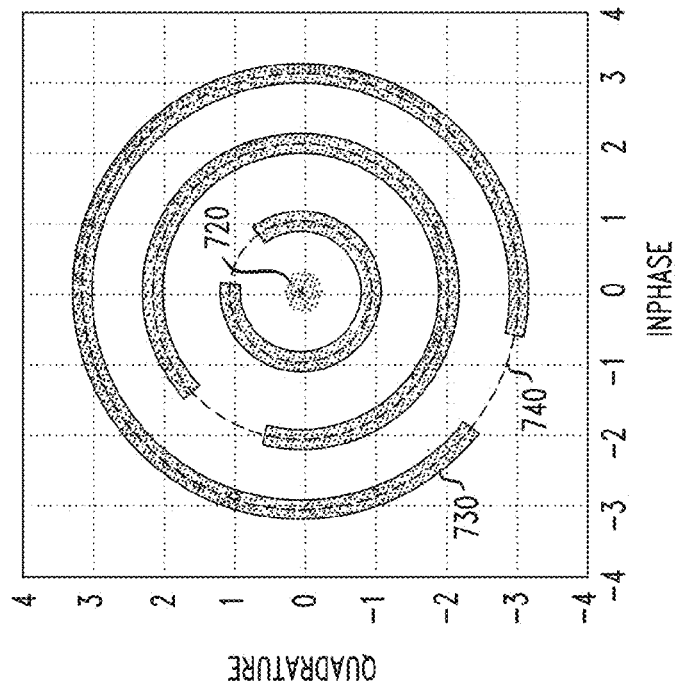

LEVEL SPACING FOR M-PAM OPTICAL SYSTEMS WITH COHERENT DETECTION

CROSS REFERENCE TO RELATED APPLICATIONS

This application claims the benefit of priority under 35 U.S.C. §119(e) to U.S. provisional application No. 61/769,078 filed Feb. 25, 2013, and to U.S. provisional application No. 61/772,664 filed Mar. 5, 2013, the contents of both being incorporated by reference in their entireties. This application is a divisional of application Ser. No. 14/032,886, issued as U.S. Pat. No. 9,374,167, incorporated by reference herein in its entirety.

TECHNICAL FIELD

The disclosure relates generally to the field of optical communication.

BACKGROUND

This section introduces aspects that may be helpful to facilitating a better understanding of the inventions. Accordingly, the statements of this section are to be read in this light and are not to be understood as admissions about what is in the prior art or what is not in the prior art.

The rapid growth of Internet and cloud computing applications drives an increasingly significant demand for capacity of communication networks. With the commercialization and deployment of 100 Gb/s technologies using polarization-division-multiplexed quadrature-phase-shift-keying (PDM-QPSK) and digital coherent detection in optical transport networks, and the development of higher bit rates such as 400 Gb/s and 1-Tb/s technologies, there is also an urgent need to upgrade metro networks from 10 Gb/s to 100 Gb/s or greater in the near future. Digital coherent detection is one way to achieve high spectral efficiencies and networking flexibilities. However, compared with optical transport networks, metro networks are more sensitive to cost, footprint, and power consumption. There is a significant need for low-cost optical transmission systems that meet the future requirements of metro networks.

SUMMARY

One embodiment provides an apparatus that includes an optical transmitter configured to provide an optical signal amplitude-modulated among M different levels. A constellation control module is configured to provide a drive signal to control the optical signal. A feedback module is configured to receive a measure of spacing between amplitude peaks of a signal constellation of the optical signal and to adjust the optical signal in response to the measure of symbol spacing.

Another embodiment provides a method, e.g. for forming an optical transmitter. The method includes configuring an optical transmitter to provide an optical signal amplitude-modulated among M different levels. The method further includes configuring a constellation control module to control a drive signal to control the optical signal. The method still further includes configuring a feedback module to receive a measure of spacing between amplitude peaks of a symbol constellation of the optical signal. The feedback module is further configured to adjust the optical signal in response to the measure of spacing.

In any embodiment the constellation control module and feedback controller may be configured to substantially equalize spacing between symbols of an amplitude-shift keyed symbol constellation. In any embodiment the optical transmitter may include a vertical cavity surface-emitting laser (VCSEL) configured to generate the optical signal in response to the drive signal. In any embodiment the drive signal may indicate an amplitude, a bias level and an amplitude peak spacing. In any embodiment the feedback module may be configured to provide an amplitude peak spacing adjustment signal. In any embodiment the optical transmitter may include an electro-absorption modulator configured to modulate light from the laser into the M different levels in response to the drive signal. In any embodiment the optical transmitter may include a Mach-Zehnder modulator (MZM) configured to modulate light from a laser into the M different levels in response to the drive signal.

Any embodiment may further include a coherent optical receiver. The receiver may be configured to determine a spacing between amplitude peaks of the symbol constellation, and may be further configured to produce the measure of symbol spacing therefrom. In any embodiment two lasers may be configured to provide polarization-multiplexed signals on first and second different polarizations of the optical signal.

Another embodiment provides a second apparatus, e.g. an optical receiver. The apparatus includes an optical detector and a constellation characterization module. The optical detector is configured to demodulate a received optical signal and to produce therefrom a received symbol constellation. The constellation characterization module is configured to determine a spacing between amplitude peaks of the received symbol constellation, and to provide a measure of the symbol spacing.

The following embodiments are described in relation to the second apparatus. In any embodiment the optical receiver may include a local oscillator and optical hybrid configured to determine in-phase and quadrature components of the optical signal. In any embodiment the optical receiver may include an optical 120-degree hybrid configured to determine in-phase and quadrature components of the optical signal. In any embodiment each symbol of the symbol constellation may be represented by a closed curve in the in-phase/quadrature (I/Q) plane. In such embodiments the amplitude detector may determine a spacing between the closed curves.

BRIEF DESCRIPTION OF THE DRAWINGS

A more complete understanding of the present invention may be obtained by reference to the following detailed description when taken in conjunction with the accompanying drawings wherein:

FIGS. 7A-7C illustrate aspects of a received constellation, wherein FIG. 7A illustrates an embodiment in which the constellation includes continuous closed curves, and wherein FIGS. 7B and 7C illustrate embodiments in which the constellation includes open arcs;

DETAILED DESCRIPTION

The disclosure is directed to, e.g. apparatus, systems and methods for transmitting optical communications signals.

Embodiments presented herein describe cost-effective solutions for improved optical transmission of data over metro networks, e.g. typically in the range of 100 km to 1000 km. In one nonlimiting example embodiment, a 100 Gb/s signal is transmitted over a 960-km standard single-mode fiber (SSMF) using 1.5-μm directly modulated VCSELs implementing an ASK modulation scheme. Embodiments may be applicable to, e.g. next-generation 100 Gb/s metro networks. Reception of the transmitted signal is enabled by digital coherent detection. Such a transmission distance and rate represents a significant improvement, e.g. over known methods and systems for transmitting optical data using directly-modulated VCSELs.

VCSELs are used widely in short-reach and low-data-rate applications due to their relative low cost, energy efficiency, and small footprint. Recent developments have enabled 40 Gb/s operation of single-mode 1.5-μm VCSELs and a maximum transmission distance of 60 km at 10 Gb/s. A 100 Gb/s short-reach link using VCSELs with direct modulation has also been demonstrated recently, with 4-level pulse amplitude modulation (PAM), polarization-division multiplexing (PDM) and direct detection. However, only a 100 m transmission distance was achieved. For this and other considerations, directly modulated VCSELs are conventionally not generally considered to be suited for metro networks with transmission distances between 100 km and 1000 km at high data rates.

Figure 1:
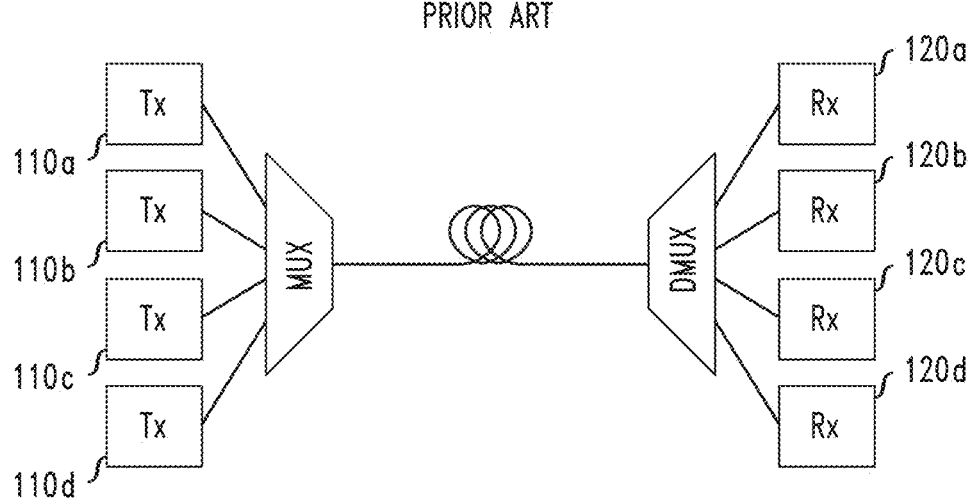
FIG. 1 illustrates a prior art system that uses multiple transmitters multiplexed to a single optical fiber, a demultiplexer and multiple receivers.

FIG. 1 illustrates a first prior art implementation that uses multiple transmitters and receivers. For example, such a system may include ten 10 Gb/s transmitters 110 and receivers 120, or as illustrated, four 25 Gb/s transmitters 110a-110d and receivers 120a-120d (4×25 Gb/s). One deficiency of such an implementation is that it occupies a large bandwidth, e.g. typically cannot fit into a 50-GHz channel spacing. Moreover such a system typically cannot transmit over a distance greater than about a few hundred kilometers without using optical dispersion compensation.

Figure 2:
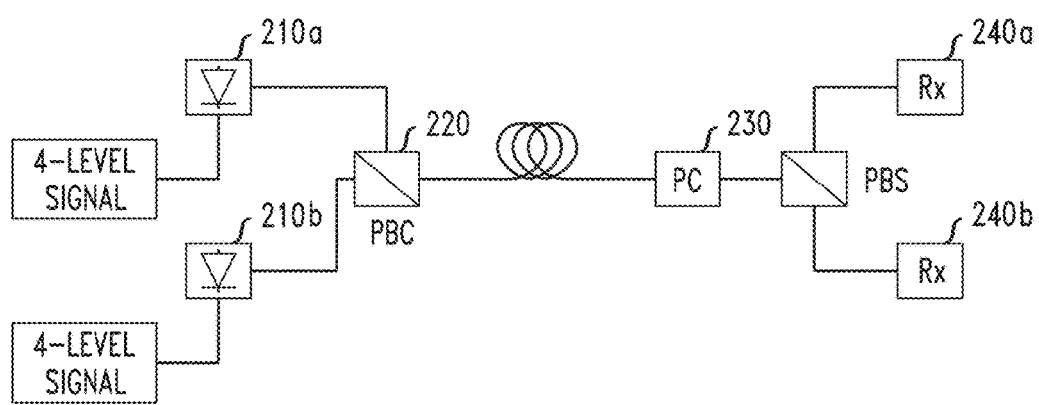
FIG. 2 illustrates a prior art system that includes a transmitter that combines outputs of two directly modulated lasers using a polarization beam combiner (PBC), and a receiver that employs direct-detection of the transmitted signal.

FIG. 2 illustrates a second prior art implementation that directly modulates two lasers 210a, 210b with 4-level signals. The laser outputs are differently, e.g. orthogonally, polarized, and combined using a polarization beam combiner (PBC) 220. The signal is received by a polarization beam splitter (PBS) 230 that separates the two polarizations. Two direct-detection receivers 240a and 240b then receive the separated polarized signals. One deficiency of such an implementation is that optical polarization tracking is typically needed, which is generally bulky. Moreover, optical dispersion compensation is typically needed for distances of more than a few tens of kilometers.

A third prior art implementation (not shown) uses subcarrier modulation. Polarization division multiplexing (PDM) can be used in this scheme to reduce the bandwidth of the signal. On the receive side, optical polarization tracking is typically needed. In addition, the scheme is sensitive to polarization-mode dispersion (PMD). (See, e.g., A. S. Karar and J. C. Cartledge et al., "Generation and Detection of a 112 Gb/s Dual Polarization Signal Using a Directly Modulated Laser and Half-Cycle16-QAM Nyquist-Subcarrier-Modulation", ECOC 2012, paper Th.3.A.4, 2012).

Embodiments within the scope of the disclosure overcome some of the deficiencies of the aforementioned prior art implementations. The inventors have discovered that optical sources, e.g. lasers, may be directly modulated with M-level electrical signals to generate M amplitude-shift keyed (ASK) optical signals. In some embodiments described below M is shown without limitation as being equal to four. The complexity of the optical transmitter is significantly reduced relative to a coherent transmitter. Polarization division multiplexing (PDM) is used in some embodiments to reduce the bandwidth of the signal. For example, a PDM-4ASK modulated system may implement a 100 Gb/s transmission rate using a 25 Gbaud symbol rate. On the receiver side, the received symbol stream may be coherently detected, which can optionally provide chromatic dispersion compensation and polarization demultiplexing in the electrical domain with digital signal processing (DSP). Because the transmitted signal is ASK modulated, no carrier frequency and phase recoveries are needed, which significantly reduces the complexity and power consumption of the receivers. In some embodiments the lasers are VCSELs, further reducing cost.

Figure 3:
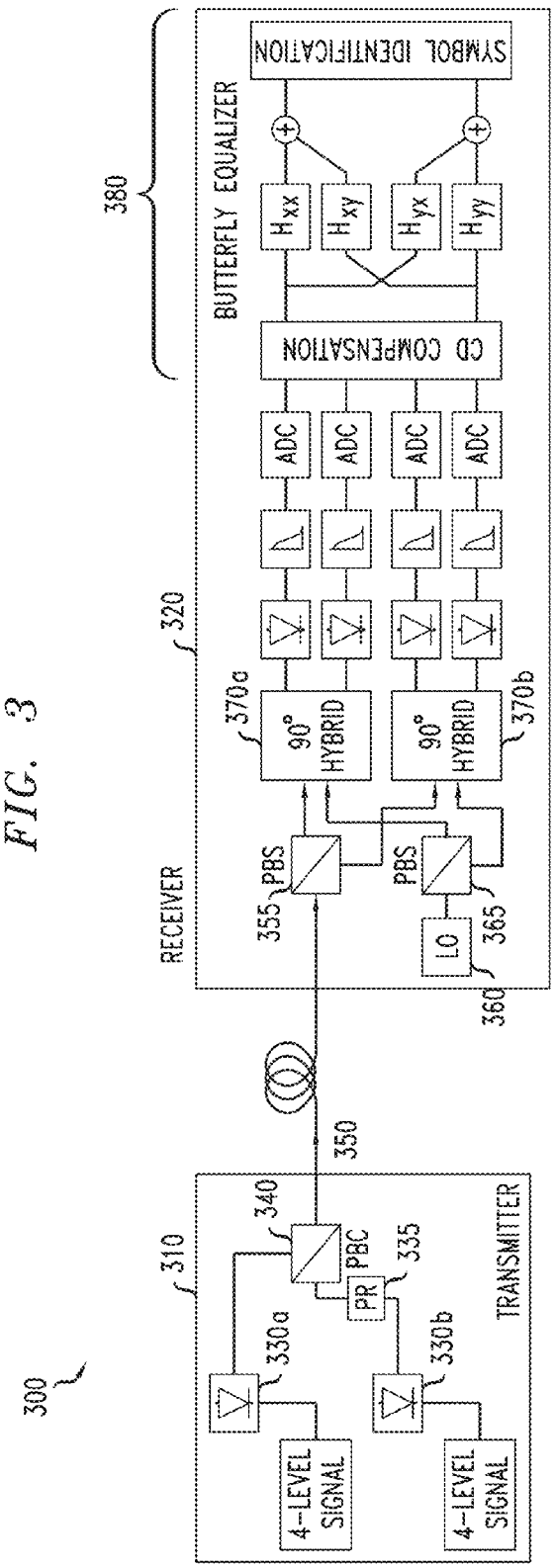
FIG. 3 illustrates an embodiment of the disclosure in which an optical communication system includes 1) a transmitter, the transmitter including lasers directly modulated with M-level, e.g. 4-level, electrical signals to generate an M-ASK optical signal, and 2) a receiver that employs an optical hybrid to demodulate the optical signal to recover data without employing carrier and phase recovery.

FIG. 3 illustrates a block diagram of a system 300 in a nonlimiting embodiment. The system 300 includes a transmitter 310 and a receiver 320. The transmitter 310 includes two lasers 330a and 330b. The lasers 330a and 330b are not limited to any particular laser type, and each may be, e.g. an edge-emitting distributed feedback (DFB), distributed Bragg reflector (DBR) or Fabry-Perot (FP) laser, a VCSEL, or a laser followed by an external modulator such as an electro-absorption modulator or an interference-based modulator. While not limited to a VCSEL, embodiments including this laser type may be advantageous in that, e.g., the VCSEL may be lower cost and have greater reliability than a comparable edge-emitting laser diode.

Each of the lasers 330a, 330b is directly modulated with M-level electrical signals, where M is shown without limitation as equal to four. The output of the laser 330a has a first well-defined polarization, e.g. horizontal (H). A polarization rotator (PR) 335 rotates polarization of the output of the laser 330b such that the polarization-rotated light has a second polarization different from the first polarization, e.g. vertical (V). The outputs of the lasers 330a, 330b are combined with a polarization beam combiner (PBC) 340, thereby producing a PDM-(M)ASK signal 350, e.g. M=4.

Referring to the receiver 320, polarization components of the signal 350, which may be arbitrarily rotated with respect to the polarization at the output of the transmitter 310, are separated by a PBS 355. A local oscillator (LO) 360 produces two polarization components, e.g. H and V, which are separated by a PBS 365. Each polarization component from the PBS 355 beats with a corresponding polarization component from the PBS 365 in a corresponding one of two polarization diverse 90° optical hybrids 370a, 370b. Unreferenced photo-detectors, e.g. single-ended or balanced photo-detectors, low-pass filters and analog-to-digital converters (ADCs) convert the outputs of the hybrids 370a, 370b to the digital electrical domain. A DSP 380 provides chromatic dispersion (CD) compensation, polarization demultiplexing and intersymbol interference (ISI) equalization. In some embodiments the symbol identification may be performed directly after the equalizers. Notably, no carrier frequency and phase recoveries are needed by or are used in the illustrated embodiment.

Figure 4:
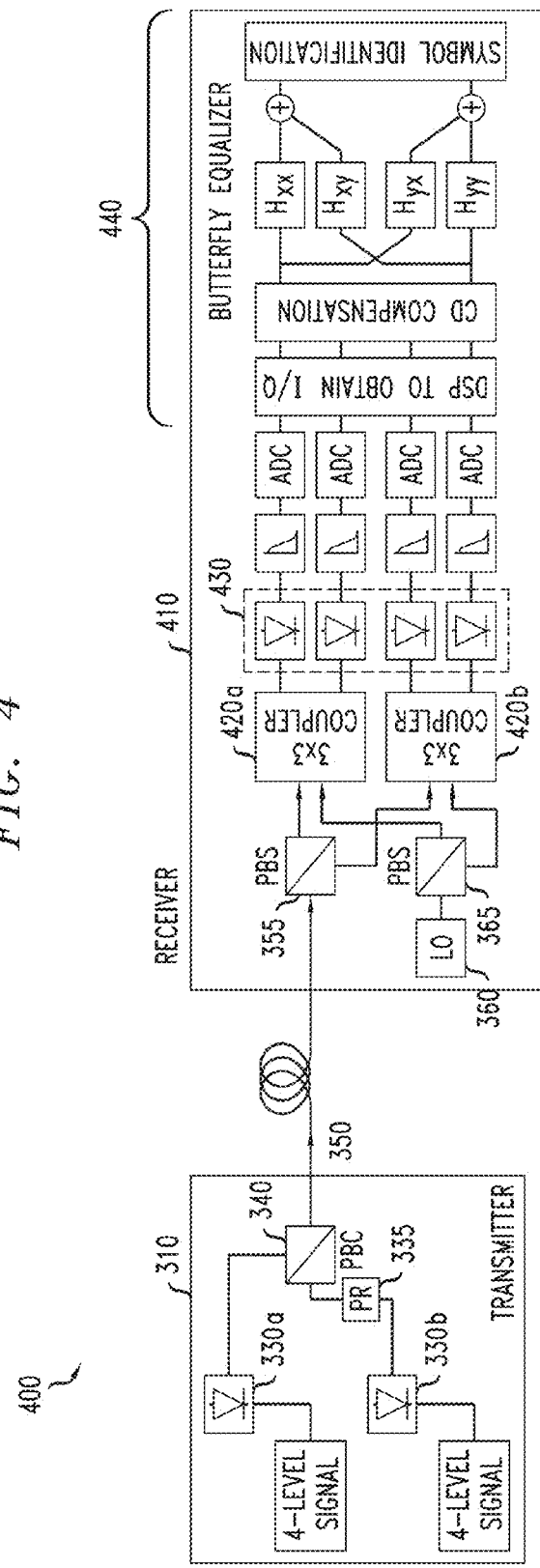
FIG. 4 illustrates an alternate embodiment of the receiver of FIG. 3 in which optical 120-degree hybrids, e.g. 3×3 optical couplers, provide some functionality of the optical hybrids of FIG. 3.

FIG. 4 illustrates an alternate embodiment, e.g. a receiver 400, that includes a receiver 410. In this embodiment, optical 120-degree hybrids, e.g. 3×3 couplers, 420a, 420b replace the 90° optical hybrids 370a and 370b of the system 300. It has previously been shown that appropriately configured 3×3 couplers may be used in lieu of optical hybrids in optical receivers. See, e.g. in C. Xie, et al, "Colorless coherent receiver using 3×3 coupler hybrids and single-ended detection," Optics Express, Vol. 20, No. 2, pp. 1164-1171, 2012, Incorporated herein by reference. In embodiments represented by the receiver 400 the couplers 420a-b are expected to provide significantly lower cost relative to embodiments using optical hybrids, e.g. the receiver 320. Three single-ended detectors 430 are used for each 3×3 coupler, and additional signal processing may be needed to obtain I and Q components.

A DSP 440 may include the functionality of the DSP 380 and additional functionality to determine I and Q of each received polarization channel. In summary, the optical signal field $E_s$ and LO field $E_L$ at the input of the coupler, output photocurrents of the detectors 430, e.g. single-ended detectors, are described by $$\begin{pmatrix} I_1 \\ I_2 \\ I_3 \end{pmatrix} = \frac{1}{3} \begin{pmatrix} |E_L|^2 + |E_s|^2 \\ |E_L|^2 + |E_s|^2 \\ |E_L|^2 + |E_s|^2 \end{pmatrix} + \frac{2}{3} \begin{pmatrix} |E_L||E_s|\cos(\varphi + 2/3\pi) \\ |E_L||E_s|\cos(\varphi) \\ |E_L||E_s|\cos(\varphi - 2/3\pi) \end{pmatrix} \quad (1)$$

where φ represents the phase difference between the LO and the signal. The first term in Eq. (1) is the direct-detection term and the second term is the beat term. The direct-detection term can become relatively large compared to the beat term if local-oscillator-to-signal power ratio (LOSPR) is small and/or there are many wavelength-division multiplexed (WDM) channels ($|E_s|^2 \Sigma_1^M |E_{si}|^2$, where M is the number of WDM channels and $E_{si}$ is the optical signal field of channel i. The I and Q components can be obtained with the following simple operations, $$I_1 = I_2 - 0.5I_1 - 0.5I_3 = |E_L||E_s|\cos\varphi \quad (2a)$$

$$I_Q = \sqrt{3}/2(I_3 - I_{31}) = |E_L||E_s|\sin\varphi \quad (2b)$$

Figure 5:
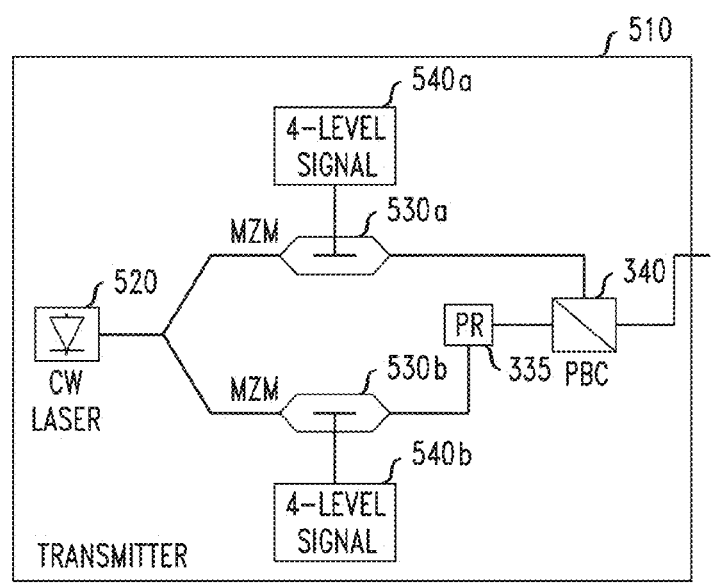
FIG. 5 illustrates an alternate embodiment of the transmitter of FIG. 3, in which Mach Zehnder modulators are employed to produce the transmitted optical signal of FIGS. 3 and 4.

FIG. 5 illustrates an alternate embodiment of an (M)ASK transmitter 510, e.g. M=4. The transmitter 510 includes an unmodulated (CW) laser source 520, Mach-Zehnder modulators (MZMs) 530a, 530b, the previously referenced PR 335 and the previously referenced PBC 340. The MZM 530a is driven by an M-level signal source 540a, e.g. M=4. The MZM 530b is driven by an M-level signal source 540b, again e.g. M=4. The CW light portions received by the MZMs 530a/b are each thereby modulated to one of M values, e.g. M=4. The PR 335 rotates the polarization of the modulated light from the MZM 530b relative to the light from the MZM 530a by, e.g. π/2 radians, and the signals are recombined by the PBC 340.

Figure 6:
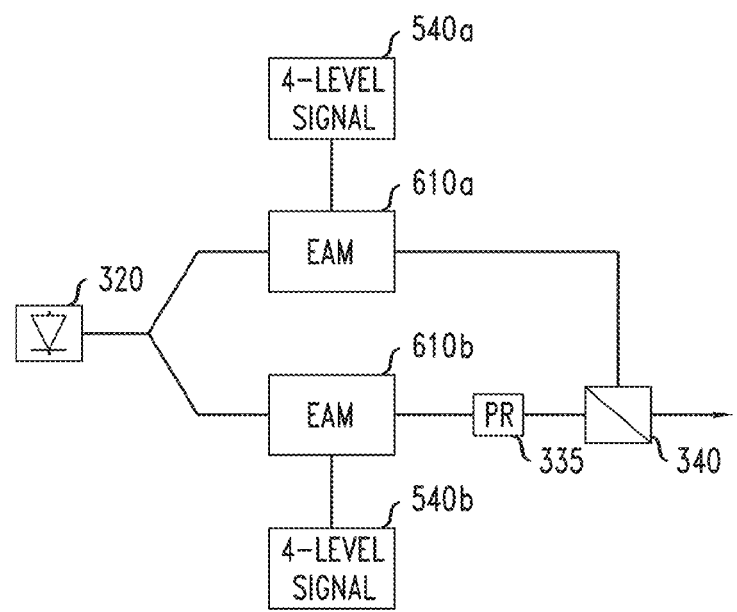
FIG. 6 illustrates an alternate embodiment of the transmitter of FIG. 3, wherein electro-absorption modulators are employed to produce the transmitted optical signal of FIGS. 3 and 4.

FIG. 6 illustrates another alternate embodiment of an (M)ASK transmitter 610, e.g. M=4, in which electro-absorption modulators (EAMs) 620a and 620b replace the MZMs of FIG. 5. As appreciated by those skilled in the optical arts, an EAM may modulate the intensity of an optical signal propagating therethrough in response to an applied voltage, wherein the voltage modulates the bandgap of the propagation medium. The EAMs 620a/b thereby may be used to modulate the intensity of the CW light received from the laser 520. The remaining elements of the transmitter 610 may operate as previously described.

Figure 7A:
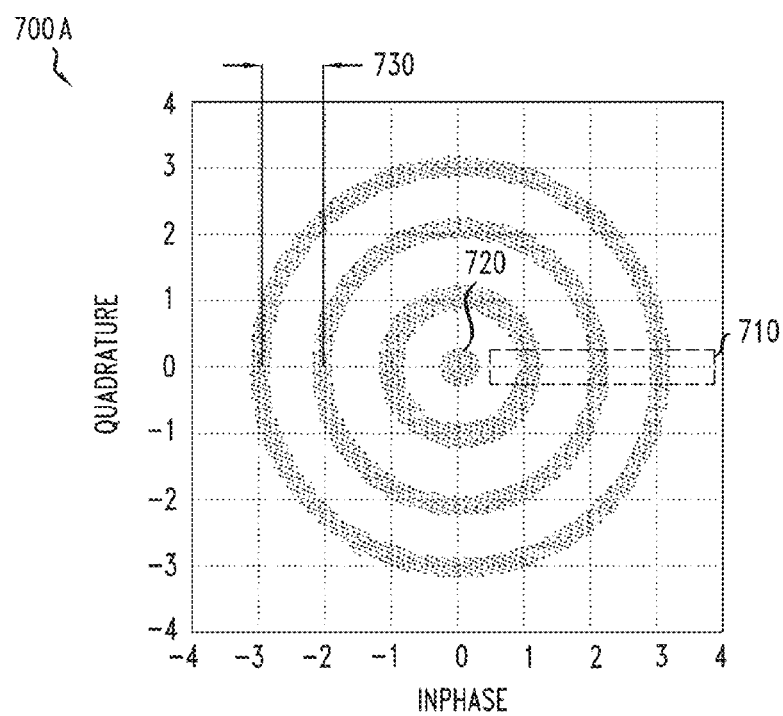

FIGS. 7A-7C illustrate aspects of received signal constellations 700A, 700B and 700C in various embodiments. Each figure show a complex I-Q space, e.g. a plane, with in-phase (horizontal axis) and quadrature (vertical axis) components of the constellations 700A-700C.

The constellation 700A includes a number of closed curves 710, e.g. concentric rings, and a symbol point 720. This constellation represents data simulated in one embodiment after equalization for one polarization of a dual-polarized transmitted signal, wherein each of the closed curves 710 and the symbol point 720 represent a transmitted symbol, as further described below. The closed curves 710 may be viewed as arcs having an angle measure of 2π. In the simulation, the linewidths of the transmitter lasers (e.g. lasers 330a/b) and the LO laser (e.g. laser 360) are 500 MHz and 10 MHz, respectively, without limitation thereto. The frequency offsets between the transmitter and LO lasers are 1 GHz and 2 GHz for x and y polarizations, respectively, without limitation thereto.

The constellation 700B illustrates aspects of the received signal constellation when the concentric rings of the constellation 700A are not fully closed, e.g. are open arcs. This constellation includes open arcs 730 and the symbol point 720. Each of the open arcs 730 and the point 720 represent a transmitted symbol. The open arcs 730 each have an angle measure less than 2π, in this example about 11π/6. Each open arc 730 may extrapolated along its radius to form closed curves, or rings, 740 that are analogous to the closed curves 710.

The constellation 700C illustrates aspects of the received signal constellation, wherein arcs 750 have an angle measure substantially less than 2π, e.g. about π/4. The arcs 750 may be also extrapolated to form closed curves, or rings, 760 that are analogous to the closed curves 710.

It is thought that the angle measure of the constellation arcs, e.g. closed curves 710 and arcs 730 and 750, is determined at least in part by the linewidth of the laser 330. It is expected that lasers 330 having a smaller linewidth produce constellation arcs having a smaller angle measure, while lasers 330 having a larger linewidth produce constellation arcs having a larger angle measure. For instance, when the laser 330 linewidth is large enough the constellation includes closed curves, such as in FIG. 7A. In the limit of very small linewidth the constellation may include points, e.g. arcs with very small angle measure. The constellations 700B and 700C illustrate examples between these two extremes, in which the arcs are open arcs.

The angular position of one of the symbol arcs in the constellations 700B and 700C may be indeterminate with respect to the others of the symbol arcs. This may occur when, e.g., the polarization rotation of the transmitted light that is resolved into each symbol arc is unconstrained. Each closed curve 710 may be referred to as a "symbol ring". Moreover, each arc 730, 750 may be referred to as a symbol ring, even if the arc has an angle measure less than 2π, e.g. is an open arc, by virtue of the extrapolation of each arc onto a closed curve such as one of the rings 740 or 760.

Herein and in the claims, the term "concentric" as applied to two or more symbol rings, closed curves or arcs means that one symbol ring, closed curve or arc is located within the other symbol ring, closed curve or arc. A first arc is located within a second arc when the first arc extrapolates to a closed curve with a smaller radius than a closed curve to which the second arc extrapolates. Thus, the constellations 700A-700C each include three concentric symbol rings, as well as a symbol located at the about the origin. For two symbol rings, the symbol ring having a smaller radius is referred to herein as a lower-order symbol ring, and the symbol ring having a larger radius is referred to herein as a higher-order symbol ring. In contrast to conventional M-QAM or M-PSK constellations, where symbols are represented by points in the complex plane, symbols are represented by entire rings here, i.e., the meaning of a symbol in these constellations is independent of the optical field value on the ring.

In contrast with some customary meanings of "concentric", as used herein concentric symbol rings need not exactly share an origin, though the term is inclusive of embodiments in which the symbol rings share an origin. Moreover, while the symbol rings 710 are about circular, embodiments include symbol rings that are not circular, e.g. a closed path such, but not limited to, about oval. In addition, in some embodiments one symbol ring may have a small radius such that that symbol ring is effectively a symbol point, at about the origin of the other symbol rings. Such a symbol point, e.g. the symbol point 720, may be regarded as a concentric symbol ring when wholly contained within one or more other symbol rings. Thus the constellation 700 represents four received symbols.

Figure 8:
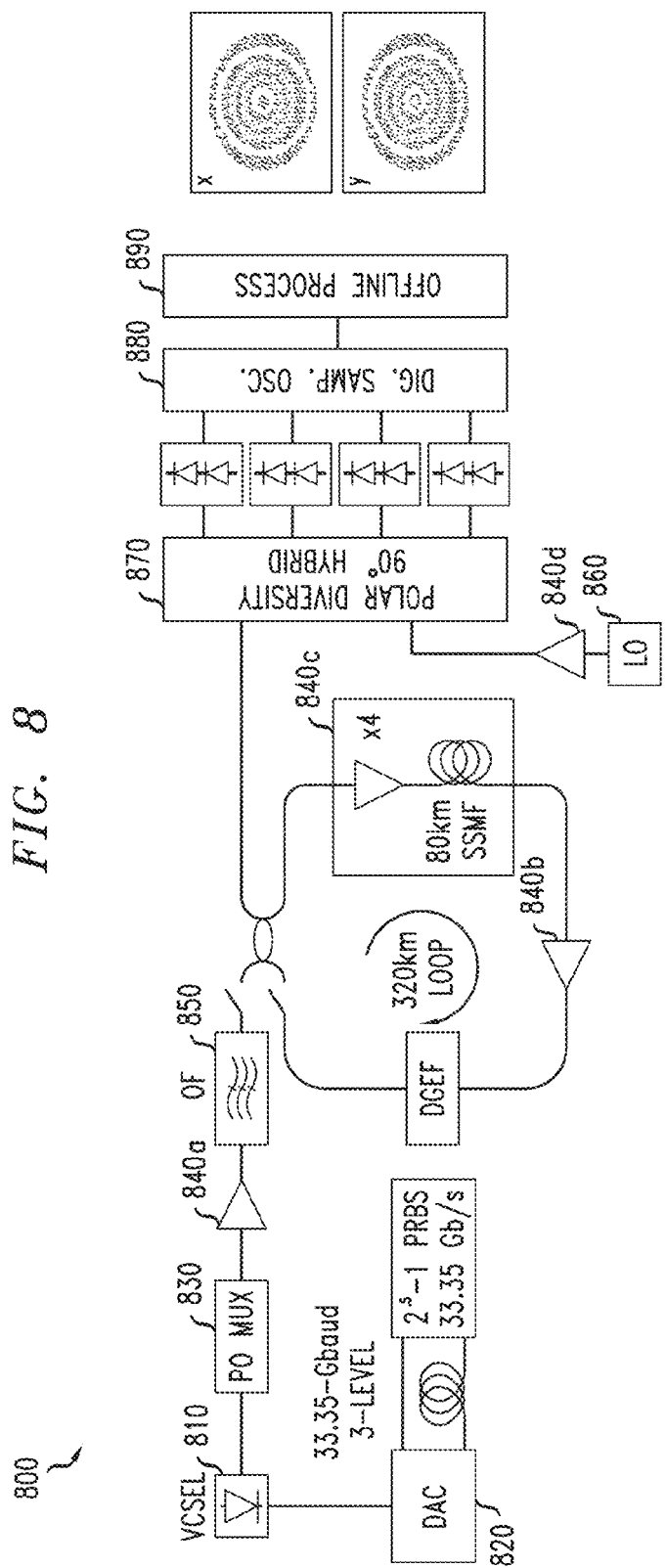
FIG. 8 illustrates an experimental configuration, including a shaping filter between the transmitter and receiver, that may be used to determine the characteristics presented in FIGS. 9A/B, 10, 11 and 12.

FIG. 8 illustrates an experimental configuration of another embodiment, e.g. a system 800. The system 800 includes a laser 810, digital-to-analog converter (DAC) 820, polarization multiplexer 830, amplifiers 840, shaping filter 850, optical path 855, amplifier LO 860, coherent receiver 870, digital sampling oscilloscope 880 and offline processing 890. Herein, when the length of the optical path 855 is negligible, the embodiment may be referred to as "back-to-back". In other embodiments the length of the optical path 855 may be on the order of hundreds of kilometers (km). In a nonlimiting example, the driver 820 provides 35 Gbaud 3-level amplitude direct modulation of the laser 810, e.g. achieving 52.86 Gb/s, and with the polarization multiplexer 830 emulates two VCSELs transmitting 105.70 Gb/s at the same wavelength channel. In various embodiments the optical filter 850 is configured to reduce the intensity of a proper subset of the plurality of concentric symbol rings. This aspect is described further below.

If the laser 810 is a VCSEL it may have a large linewidth, e.g. >500 MHz. However, this has little effect on system performance, and no carrier frequency and phase recoveries are needed in the processing 890, which further reduces complexity and power consumption of the coherent receiver.

Figure 9B:
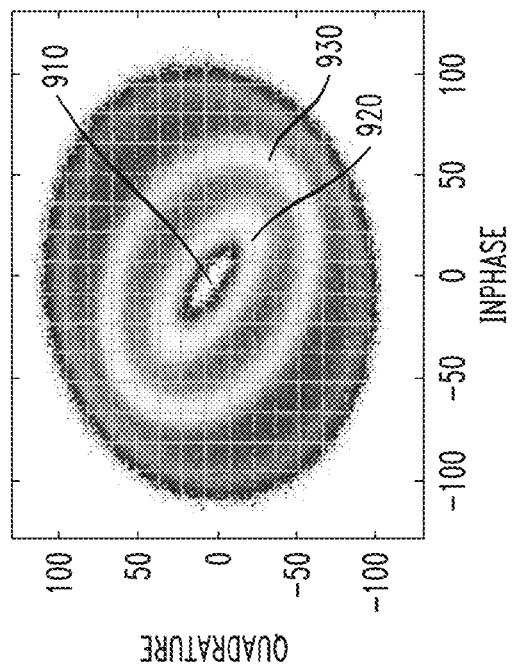
FIGS. 9A and 9B respectively illustrate I/Q characteristics of the signal transmitted by the embodiment of FIG. 8 with and without the shaping filter.
Figure 9A:
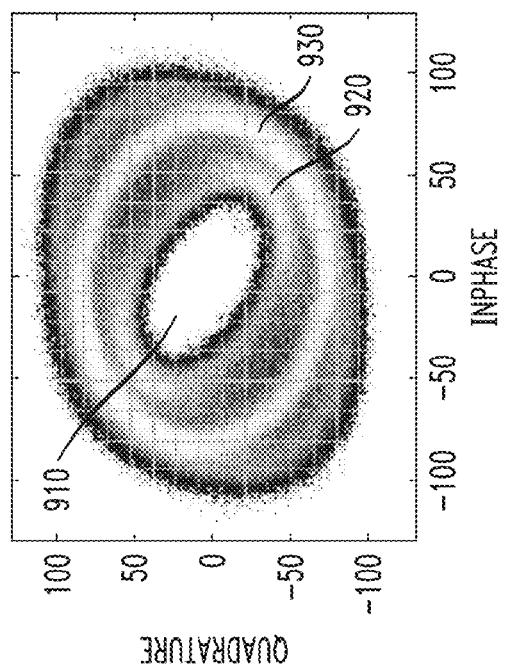

FIGS. 9A and 9B present without limitation experimentally determined symbol constellations, measured using the system 800. The experimental embodiment included a back-to-back configuration and operation of a 105.70 Gb/s PDM-3ASK signal without (9A) and with (9B) the presence of the shaping filter 850. These figures illustrate the I/Q constellation of the signal output by the amplifier 840a. Referring to FIG. 3, the shaping filter 850 may be implemented physically, e.g. by an optical element, or may be implemented by DSP at the transmitter 310 or the receiver 320. Embodiments may be described referring generally to the system 800 including the filter 850 without elaboration, recognizing that all functional aspects of the filter 850 may be implemented by DSP or an optical element. In the illustrated embodiment, the filter 850 was realized without limitation by a 0.67-nm filter, e.g. produced by JDS Uniphase Corporation, Milpitas, Calif., USA.

The filter 850 may operate to reduce the intensity of a proper subset of the concentric symbol rings. For example, inspection of FIGS. 9A and 9B indicate that the intensity of the lower-order symbol ring 910 located about at the origin of the I-Q plane (the lowest-order symbol ring) is reduced by the presence of the filter 850, thereby enhancing the contrast between the symbol rings of the set. Further comparing of the unfiltered (FIG. 9A) and filtered (FIG. 9B) characteristics, the filtering provides significant contrast enhancement of concentric symbol rings 920 and 930 of the constellation, which is expected to improve the performance of the detected signal. In another aspect, the filter 850 suppresses the lower-level amplitude and increases the amplitude difference between different signal in the I/Q space. The presence of the filter 850, by enhancing the signal contrast, is expected to significantly improve system performance in some embodiments, as further illustrated below.

Figure 10:
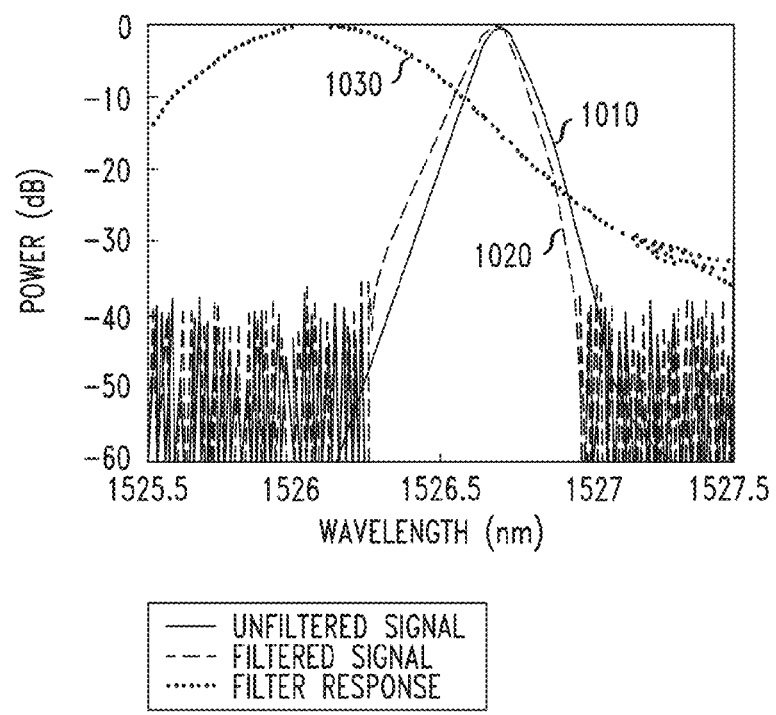
FIG. 10 illustrates peak intensity characteristics of the signal transmitted by the embodiment of FIG. 3 with and without the shaping filter and an example response of the shaping filter.

The effect of the presence of the filter 850 is further illustrated by FIG. 10, which illustrates intensity of the signal output by the amplifier 840a in the embodiment of FIG. 8 as a function of wavelength without filtering (1010) and with filtering (1020) using the previously described 0.67-nm filter. An overlying filter response 1030 illustrates operation of the filter 850 to reduce the intensity of the optical signal at wavelengths above and below about 1526 nm. The reduction has the effect of, e.g. the aforementioned intensity reduction of a proper subset of the symbol rings, e.g. the lowest order symbol ring. The filtered characteristic also illustrates significant reduction of the off-peak optical noise floor, consistent with the improved constellation characteristics shown in FIG. 9B.

In a directly modulated laser, e.g. the lasers 330a and 330b, higher-intensity symbols are typically blue shifted relative to lower-intensity symbols. In another aspect of the operation of the filter 850, when the filter 850 is aligned with the signal wavelengths in the manner illustrated in the example embodiment of FIG. 10, the red shifted signal portion (e.g. lower-intensity symbols) experiences a higher attenuation than the blue shifted signal portion (e.g. higher-intensity symbols). For example, in one aspect of the illustrated embodiment the spectrum of the signal is located at a wavelength at which the filter response has a negative slope, e.g. increasing attenuation with the increasing of wavelength. In another aspect the peak filter response is located at about 1526.1 nm, while the peak signal intensity, or the signal center frequency, is located at about 1526.7 nm. In other words, the filter response may be shifted relative to the signal center wavelength by about 0.5 nm in the direction of shorter wavelength, e.g. in the blue direction. In another view, the wavelength difference $\Delta\lambda$ between the peak filter response and the signal center wavelength is about 0.5 nm. In another view, this relationship between the peak filter response wavelength and the signal center wavelength results in conversion from frequency modulation (FM) to amplitude modulation (AM). This conversion is expected to Increase the eye-opening of the signal and thus the performance of the system. In various embodiments $\Delta\lambda$ is chosen such that the entire signal spectrum is located within the region of the filter response having negative slope, e.g., the wavelength of the whole signal spectrum is larger than center wavelength of the filter. For example, in FIG. 10 the signal spectrum 1010 is substantially located at wavelengths greater than 1526 nm and thus is coincident with the portion of the filter response 1030 having negative slope.

Figure 11:
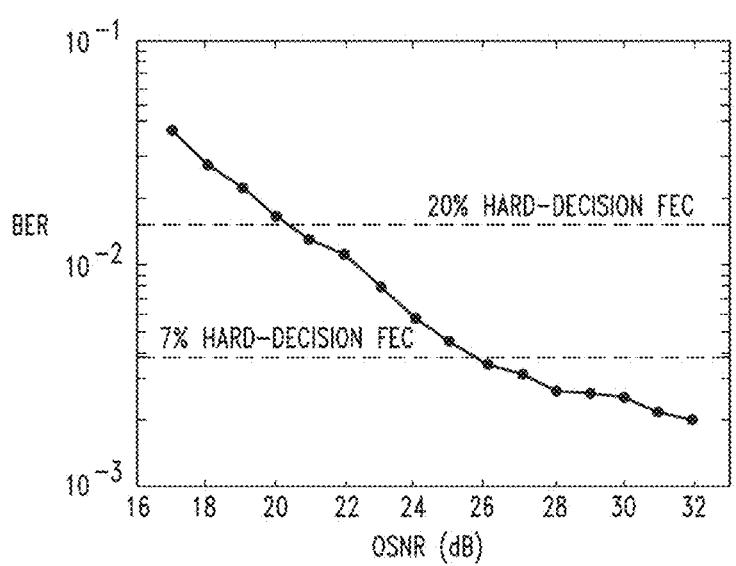
FIG. 11 illustrates experimental performance of the embodiment of FIG. 8 for back-to-back operation (e.g. negligible optical path length between the transmitter and receiver)

Considering now FIG. 11, the bit error rate (BER) of the system 800 in back-to-back operation is illustrated versus optical signal-to-noise ratio (OSNR). This characteristic shows that in this particular embodiment there is an error floor at a BER of about $2.0\times10^{-3}$. With 7% overhead hard-decision forward-error-correction (FEC) code, resulting in a net bit rate of about 98.80 Gb/s, substantially error-free operation may be expected with an OSNR larger than about 26 dB. In another aspect, if a 20% overhead hard-decision FEC code is used for a net bit rate of about 88.10 Gb/s, substantially error-free operation is expected with an OSNR larger than 20.3 dB.

Figure 12:
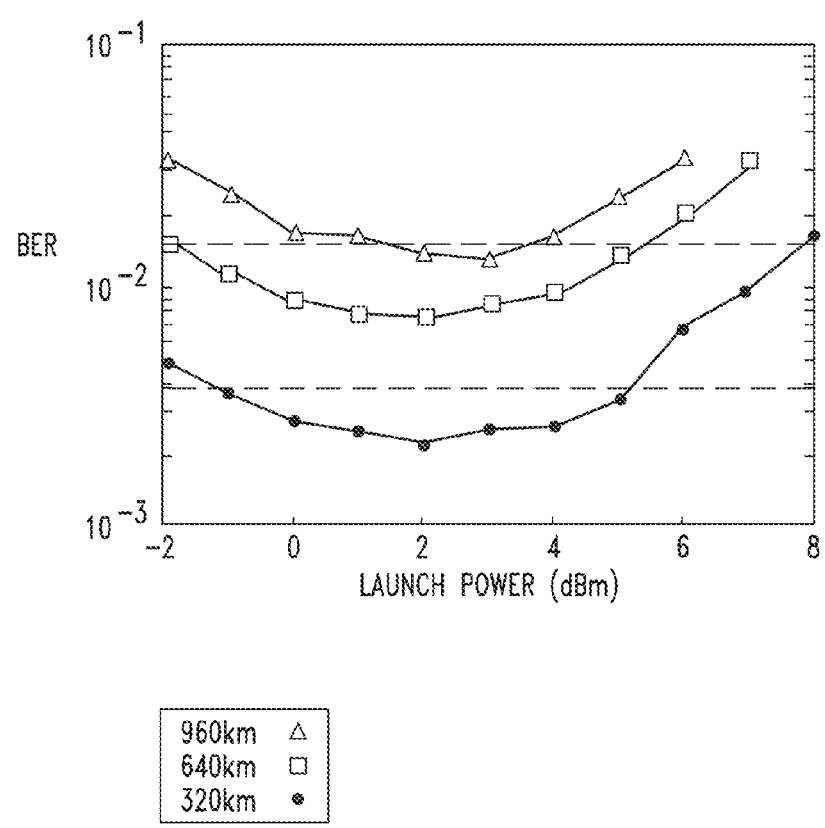
FIG. 12 illustrates bit error rate (BER) characteristics of the embodiment of FIG. 8 as a function of launch power for three span lengths, e.g. 320 km, 640 km and 960 km.

FIG. 12 illustrates BER characteristics as a function of launch power of a signal into the optical path 850 for three span lengths, 320 km, 640 km and 960 km at bit rate of 105.7 Gb/s. Each characteristic has a minimum BER for a launch power between about 2 and about 3 dBm. With 7% FEC overhead, a 320 km transmission distance may be achieved, while with a 20% FEC overhead a 960 km transmission distance may be achieved. This transmission capability for an ASK signal is heretofore unknown, and an unexpectedly beneficial aspect of the described embodiments. For example, the previously described maximum transmission distance of a 4-level PAM with PDM and direct detection was about 100 m. Thus the results illustrated in FIG. 12 are an improvement by a factor of at least about 1000 over previous transmission distance limits, and may even represent an improvement of at least about 10,000. Such results clearly provide potential benefit for cost-effective optical transmission in metro networks.

Figure 13:
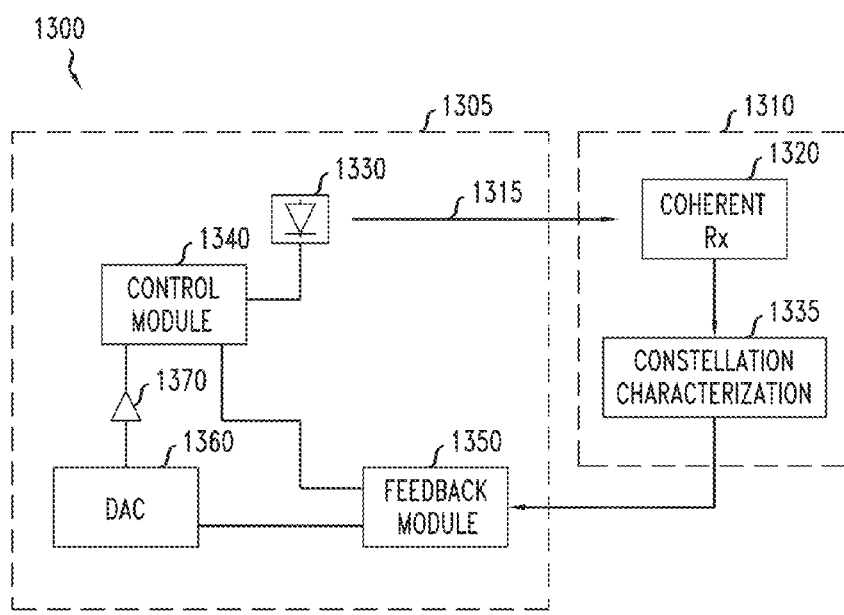
FIG. 13 illustrates a embodiment of a PAM transmission system configured to about equalize spacing between constellation symbols, such as the symbol rings of FIG. 7A.

Turning now to FIG. 13, an embodiment denoted 1300 is illustrated, e.g. an optical transmission system, that includes an optical transmitter 1305 and an optical receiver 1310. The transmitter 1305 is configured to transmit a modulated optical signal 1315 to the receiver 1310 by way of an optical path. The optical path is not limited to any particular type, but may in some embodiments include an optical fiber. As was described with respect to the laser 330a and 330b, a laser 1330 is configured to provide an optical signal that is amplitude-modulated among M different levels. The modulation produces a signal constellation, such as exemplified by the constellations 700A, 700B and 700C. A constellation control module 1340 is configured to control an amplitude and/or a bias of laser drive signal of the laser 1330, e.g. to provide the amplitude modulation of the optical signal 1315 to produce the signal constellation.

The transmitter 1305 also includes a feedback module 1350. The feedback module 1350 is configured to receive a measure of symbol spacing of the signal constellation of the optical signal 1315 and to regulate the control module 1340 to adjust the laser 1330 drive signal in response to the measure of symbol spacing. In the illustrated embodiment the feedback module 1350 provides a first electrical signal to the control module 1340 and a second electrical signal to a digital-to-analog converter (DAC) 1360. An optional amplifier 1370 may scale the output of the DAC 1360 to an appropriate level. The first signal may be a bias adjust and/or amplitude signal, e.g. may direct the control module 1340 to change a DC bias and/or signal amplitude applied to the laser 1330 drive signal. The second signal may be a peak amplitude spacing adjustment signal, e.g. may direct the DAC 1360 to change one or more peak amplitude spaces between constellation symbols. The bias/amplitude adjust signal and the symbol spacing adjustment signal may be applied dynamically, e.g. on the time scale of the individual symbols conveyed by the optical signal 1315, so that a spacing between the amplitude peaks of the signal constellation may be controlled.

In some embodiments the spacing between the constellation amplitude peaks is determined at the receiver 1310 by a constellation characterization module 1335. The module 1335 may determine a spacing between at least two amplitude peaks of the received constellation, e.g. between rings of the constellation 700A. Referring to FIG. 7A, for example, the module 1335 may determine a spacing 730 between amplitude peaks of adjacent pairs of the closed curves 710. For embodiments in which the symbol constellation includes symbol arcs, such as exemplified in FIG. 7C, the module 1335 may determine the spacing 730 between extrapolated closed curves such as the rings 760. The module 1335 may communicate to the feedback module 1350 the amplitude peak spacing information, from which the feedback module 1350 may command changes of the amplitude and/or DC bias of the laser control signal via the control module 1340 and/or symbol spacing via the DAC 1360. In such embodiments the symbol spacing may include any effects of the transmission medium over which the signal 1315 propagates, e.g. an optical fiber.

It is preferred that the spacing between amplitude peaks, e.g. between constellation symbols, be substantially equal among the adjacent symbols. In various embodiments, "substantially equal" means the spacing between peak amplitudes in the symbol constellation differ by less than about 10%. In some cases, it may be preferable that the spacings differ by no greater than about 5%. In still other cases, it may be preferable that the spacings differ by no greater than about 1%. Moreover, as exemplified in the constellation of FIG. 9B, sometimes the constellation symbols, or rings, may substantially depart from circular symmetry. In such cases the module 1335 may determine any suitable measure of the spacing between the peak amplitude of adjacent pairs of symbols, e.g. an average spacing, or determining the spacing between best-fit geometrical models of the constellation symbols, e.g. ellipses.

It is noted that the embodiment of FIG. 13 is described for the nonlimiting example of controlling the laser 1330 to produce the signal 1315 in response to the output of the drive module 1340. In some other embodiments, the signal 1315 may be produced by, e.g. the transmitter 510 (FIG. 5) or the transmitter 610 (FIG. 6). In such embodiments, the control module 1340 may control an electro-absorption modulator or an MZM as appropriate to the particular embodiment.

Figure 14:
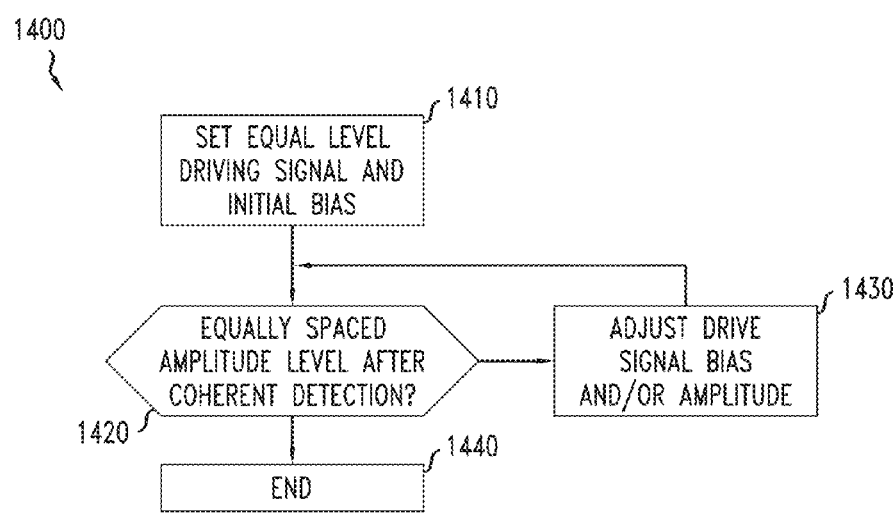
FIG. 14 illustrates an embodiment of a method of operating the system of FIG. 13 to equalize symbol spacing.

FIG. 14 presents an embodiment of a method 1400, e.g. for adjusting the amplitude and/or DC bias of the signal 1315 to at least partially equalize differences in amplitude between symbols of a received constellation, e.g. a pulse amplitude modulation constellation. The method 1400 may be performed, e.g. by the control module 1340 and DAC 1360. Below, the method 1400 is described with reference to the functional entities illustrated in FIG. 13 without limitation to the illustrated embodiment. Furthermore, those skilled in the pertinent art will appreciate that the illustrated method 1400 may include additional steps, or may include different steps, that effect the desired amplitude characteristics while remaining within the scope of the disclosure.

In a step 1410 the laser control signal is set, e.g. by the control module 1340 and the DAC 1360, such that the laser is driven with equally spaced diving signal and an initial bias. By "equally spaced diving signal", it is meant that the laser driving signal has M different levels, each of which is about equally spaced from its neighboring levels. Thus, for example, to produce the constellation 700A the laser driving signal could have four levels that are about integer multiples of an initial level $V_o$, e.g. $V_o$, $2V_o$, $3V_o$, and $4V_o$. The initial bias may be any value, e.g. about zero volts DC. The spacing may be computed between two adjacent symbol rings, e.g. $(2V_o-V_o)=V_o$.

In a step 1420 it is determined whether the amplitude levels of the signal constellation are about equally spaced, e.g. by the module 1335 after detection by the receiver 1320. If the amplitudes are not determined to be about equally spaced then the method advances to a step 1430, in which the amplitude and/or DC bias of the laser control signal is/are adjusted and/or the level spacing of the DAC is adjusted. Such adjustment may include sending by the module 1335 to the feedback module 1350 one or more signals characterizing differences between the received constellation and desired amplitude characteristics, e.g. even spacing between symbol rings. The feedback module 1350 may then operate as previously described to effect a change of the laser control signal. The method 1400 then returns to the step 1420 and again tests the symbol amplitudes of the received constellation. If the symbol constellation responded in a desired manner to the change of amplitude and/or DC bias of the laser control signal and the level spacing of the DAC, the module 1335 and the feedback module may operate to incrementally about equalize differences of the constellation symbol spacing. If instead the symbol constellation responded such that the differences in constellation symbol spacing are greater, the module 1335 and the feedback module 1350 may operate to change the amplitude and/or DC bias of the laser control signal in a manner that differences of the constellation symbol spacing.

When the spacing between the constellation symbols reaches a threshold value, e.g. a level that results in reduced BER of the symbol stream received by the receiver 1320, the method 1400 may advance to a termination state 1440. Of course the module 1335 and the feedback module 1350 may continue to monitor the received symbol constellation and operate to change laser control signal amplitude and/or DC bias and level spacing as needed to maintain a desired level of BER.

Figure 15:
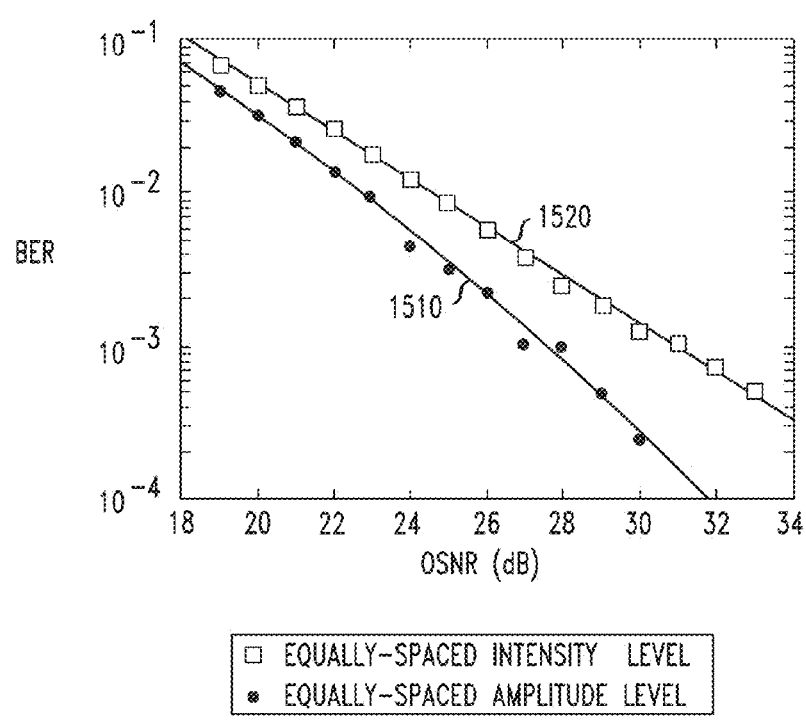
FIG. 15 illustrates experimental performance of a test system configured to implement the embodiment illustrated in FIG. 13 in a 4-PAM transmission system in back-to-back operation (e.g. negligible optical path length between the transmitter and receiver).

FIG. 15 illustrates BER as a function of OSNR for two cases of a test system transmitting a 32 Gbaud 4-PAM signal generated by an EAM. For a first BER characteristic 1510 a laser, e.g. the laser 1330, was controlled to equalize the intensities of the constellation symbols, e.g. the rings of the constellation 700A. This case is similar to the BER characteristic shown in FIG. 8. For a second BER characteristic 1520, the laser was controlled to equalize the spacing between the constellation symbols. A comparison between the BER characteristics for these two cases shows about a factor of ten improvement of BER at 30 dB OSNR, which is expected to significantly improve transmission fidelity and/or allow for a longer transmission reach. This result, a further improvement over the already highly favorable results discussed in FIG. 11, are also heretofore unknown, and provide an additional unexpectedly beneficial aspect of the described embodiments. The additional improvement provided by the embodiment of FIGS. 13 and 14 clearly indicates that symbol-spacing equalization in the contact of PAM transmission is outside the scope of conventional optical techniques, and represents a significant advance of the state of the art in metro transmission systems.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

The invention claimed is:

1. An apparatus, comprising:
   an optical receiver configured to demodulate a received optical signal and to produce a symbol constellation therefrom; and
   a constellation characterization module configured to determine a spacing between amplitude peaks of the symbol constellation,
   wherein each of a plurality of symbols of the symbol constellation is represented by one of a corresponding plurality of concentric symbol rings in the in-phase/quadrature (I/Q) plane, and the constellation characterization module is configured to resolve the symbols by determining said spacing between the concentric symbol rings.

2. The apparatus of claim 1, wherein the optical receiver includes a local oscillator and optical hybrid configured to determine in-phase and quadrature components of the optical signal.

3. The apparatus of claim 1, wherein the optical receiver includes an optical 120-degree hybrid configured to determine in-phase and quadrature components of the optical signal.

4. The apparatus of claim 1, wherein the optical receiver is configured to determine values of the symbols independent of optical field value of the symbol rings.

5. An apparatus, comprising:
an optical receiver configured to demodulate a received optical signal and to produce a symbol constellation therefrom;
a constellation characterization module configured to determine, without carrier frequency or phase recovery, a spacing between amplitude peaks of the symbol constellation, and to provide a measure of the spacing.

6. The apparatus of claim 5, wherein the optical receiver includes a local oscillator and optical hybrid configured to determine in-phase and quadrature components of the optical signal.

7. The apparatus of claim 5, wherein the optical receiver includes an optical 120-degree hybrid configured to determine in-phase and quadrature components of the optical signal.

8. The apparatus of claim 5, wherein the optical receiver determines values of the symbols independent of optical field value of the symbol rings.

9. The apparatus of claim 5, wherein symbols of the symbol constellation are represented by concentric symbol rings in the in-phase/quadrature (I/Q) plane, and the constellation characterization module is configured to and to resolve symbols of said symbol constellation by determining a spacing between the concentric symbol rings.

10. A method, comprising:
configuring an optical receiver to demodulate a received optical signal and to produce a symbol constellation therefrom; and
configuring a constellation characterization module to determine a spacing between amplitude peaks of the symbol constellation,
wherein each of a plurality of symbols of the symbol constellation is represented by one of a corresponding plurality of concentric symbol rings in the in-phase/quadrature (I/Q) plane, and the constellation characterization module is configured to resolve the symbols by determining said spacing between the concentric symbol rings.

11. The method of claim 10, wherein the optical receiver includes a local oscillator and optical hybrid configured to determine in-phase and quadrature components of the optical signal.

12. The method of claim 10, wherein the optical receiver includes an optical 120-degree hybrid configured to determine in-phase and quadrature components of the optical signal.

13. The method of claim 10, wherein the optical receiver is configured to determine values of the symbols independent of optical field value of the symbol rings.

* * * * *